United States Patent Office 3,632,643
Patented Jan. 4, 1972

3,632,643
PREPARATION OF ACYL FLUORIDES BY CARBONYLATION OF AROMATIC HALIDES IN THE PRESENCE OF AN ALKALI METAL FLUORIDE AND A RUTHENIUM-, RHODIUM- OR PALLADIUM-CONTAINING CATALYST
William W. Prichard, Hockessin, Del., assignor to E. I. du Pont de Nemours and Company, Wilmington, Del.
No Drawing. Filed June 26, 1967, Ser. No. 648,988
Int. Cl. C07c 51/58
U.S. Cl. 260—544 A
11 Claims

ABSTRACT OF THE DISCLOSURE

Aromatic halides react with carbon monoxide and alkali metal fluorides in the presence of ruthenium, rhodium and palladium metals or their halides to yield acyl fluorides. Inorganic Lewis acids can be added to improve the conversion.

BACKGROUND OF THE INVENTION

This invention relates to a new and improved process of preparing aromatic acyl fluorides.

Aromatic acyl fluorides, i.e., aroyl fluorides, are valuable chemicals. In some instances, they are capable of reactions of which the corresponding aroyl chlorides are incapable. Thus, they can react with aromatic nuclei to give ketones in the absence of added Friedel-Crafts catalysts, whereas aroyl chlorides require the presence of such catalysts. Bifunctional aromatic acyl fluorides are intermediates in the preparation of valuable condensation polymers by reaction with, for example, diamines or dihydric alcohols. Moreover, aroyl fluorides are in general more stable and resistant to hydrolysis than aroyl chlorides.

It is known (Prichard U.S. Pat. 2,696,503) to prepare aroyl fluorides by carbonylation of aryl halides in the presence of an alkali metal fluoride and nickel carbonyl or a precursor thereof such as metallic nickel or a nickel halide. This process is not free from disadvantages, however. Not only are the conversions rather low, but the reaction promoter or catalyst, i.e., nickel carbonyl or a precursor, must be used in much larger than catalytic amounts, because of side reactions which destroy it in part. In practice, the nickel carbonyl is used in stoichiometric or higher amounts relative to the aryl halide. Another disadvantage is the toxicity and fire hazard of nickel carbonyl.

It has now been found that, under essentially the same operating conditions, this process can be made to produce aromatic acid fluorides in much higher conversions by using a reaction promoter which is truly catalytic in action, and thus is effective in very minute amounts.

SUMMARY OF THE INVENTION

This invention is a process of preparing aromatic acyl fluorides which comprises contacting, and reacting, under substantially anhydrous conditions at a temperature of at least 250° C. and under a pressure of at least 100 atmospheres, an aromatic halide in which halogen of atomic number 17–53 is attached to nuclear carbon of an aromatic carbocyclic ring with carbon monoxide and at least an approximately stoichiometric amount of an alkali metal fluoride or hydrogen fluoride, in the presence of a catalytic amount of a catalyst which can be metallic ruthenium, rhodium or palladium, or halide salts thereof, the reaction mixture preferably but not necessarily also containing a catalytic amount of an inorganic Lewis acid.

The starting materials for use in this process are the carbocyclic aromatic halides defined by the formula $Ar(X)_n$, where X is a halogen (chlorine, bromine or iodine) directly attached to nuclear carbon; $n$ is 1 or 2; and Ar is a monocyclic, polycyclic or fused polycyclic aromatic radical containing from one to three six-membered carbocyclic aromatic rings, or is a polycyclic radical containing two six-membered carbocyclic aromatic rings joined through an atomic bridge which may be —O—, —S—, —SO$_2$—, —CO— or —(CH$_2$)$_m$—, where $m$ is 1 or 2.

The aromatic rings must be substituted with at least one chlorine, bromine or iodine atom as indicated above. Other substituents can also be present. These substituents should be free of Zerewitinoff-active hydrogen, since such substituents react with the acid fluoride groups which are formed by the process of this invention. The substituents are preferably inert under the conditions of reaction so that aroyl fluorides corresponding to the aryl halides are formed. Such substituents include fluorine, alkyl groups, alkoxy groups, alkyl ester groups and cyano groups. In the substituents lower alkyl compounds, that is alkyl groups containing from 1 to about 6 carbon atoms are preferred since they are more readily available.

The catalyst system which is the distinguishing feature of this invention comprises, as the primary active ingredient, one of the metals ruthenium, rhodium or palladium. These metals can be used in the free, uncombined state, either unsupported or, preferably, on one of the conventional catalyst supports such as activated carbon, charcoal, Carborundum, silica gel, alumina, acidic silica-alumina, and the like; or as the metal halide, preferably chloride or bromide, as such or on a support. The metal catalyst can be used alone, as illustrated in some of the examples that follow. However, better conversions to the aroyl fluoride are generally obtained when the catalyst system also contains an inorganic Lewis acid. Lewis acids, as first defined by G. N. Lewis in his classic paper in J. Franklin Institute 226, 293 (1938), are well known to chemistry. By definition, a Lewis acid is a molecule, the structure of which, electronically speaking, is such that it is capable of accepting one or more electrons from a molecule which is capable of donating such electrons, i.e., has an electron-rich structure. Many and varied Lewis acids are known. Examples of wholly inorganic Lewis acids, which are those coming under consideration here, are the halides of certain elements which include aluminum chloride, aluminum bromide, tin tetrachloride, zinc chloride, zinc bromide, hydrogen chloride, hydrogen bromide, boron trichloride, boron trifluoride, titanium tetrachloride, antimony pentachloride, ferric chloride, the mineral silicates and silicas, etc. The catalyst(s) need be used only in catalytic amounts. Thus, there is generally used, per mole of aromatic halide in the reaction system, between 0.0005 and 0.01 g. atom of free ruthenium, rhodium or palladium metal or mole of metal halide, and between 0.001 and 0.02 mole of Lewis acid. Of course, much larger quantities of the catalysts can be used, but this is generally unnecessary.

The other process conditions are essentially those described in U.S. Pat. 2,696,503. Any alkali metal fluoride (e.g., lithium, sodium, potassium, cesium fluorides) can be used or an equivalent amount of hydrogen fluoride can be used. For economic reasons, sodium fluoride is preferred. The amount of alkali metal fluoride in the reaction mixture is not critical, since the reaction will proceed regardless of what it is, but, for maximum utilization of the aromatic halide and avoidance of side reactions, it is best to use at least 0.8 mole of alkali metal fluoride per gram atom of halogen to be replaced. Preferably, there is used between 1 and 2.5 moles of alkali metal fluoride per gram atom of halogen.

The reaction is conducted at a temperature of at least 250° C. The upper limit of temperature is only the decomposition point of the reactants and reaction product. In practice, it is not necessary to exceed about 400° C., although somewhat higher temperatures can be used in a continuous flow, low contact time system. The preferred temperature range is that between 300 and 350° C.

For practical conversions, the pressure in the reaction vessel, which is mostly due to carbon monoxide, should be at least 100 atmospheres, although extrapolation of the pressure versus conversion curve indicates that low conversions will be obtained at much lower pressures and even at atmospheric pressure. The pressure can be as high as the equipment can withstand, e.g., up to 3000 atmospheres or more. The preferred range is 600–900 atmospheres.

No solvent or reaction medium is necessary when the aromatic halide is liquid at the operating temperature. However, an inert solvent is often useful to facilitate contact between the reactants. Suitable solvents include the hydrocarbons such as n-hexane, cyclohexane, benzene, toluene or the xylenes, and aromatic ethers such as diphenyl ether.

The reactants, solvents if any, and equipment used should be substantially anhydrous since the presence of water or moisture decreases the yields through hydrolysis of the reaction product.

The following examples illustrate the invention, but should not be construed as fully delineating the scope thereof.

EXAMPLE 1

A corrosion-resistant pressure vessel was charged with 75 g. of chlorobenzene, 0.5 g. of anhydrous palladium chloride, 1.0 g. of anhydrous aluminum chloride and 25 g. of sodium fluoride. The vessel was sealed, a pressure of 200 atmospheres of carbon monoxide was applied and the vessel was heated, with shaking, to 300° C. The internal pressure was then raised to 900 atmospheres by injection of carbon monoxide and the reaction mixture was maintained at this temperature and pressure for 4 hours by heating and by addition of carbon monoxide as necessary. The vessel was then allowed to cool, vented and the contents discharged. The insoluble solids were removed by filtration and the filtrate distilled at 50 mm. pressure through a spinning-band column. Two major fractions were obtained. The first, B.P. 55° C./50 mm., 24.35 g., was identified as recovered chlorobenzene by its infrared spectrum and physical properties. The second, B.P. 74–75° C./50 mm., 13.77 g., was identified as benzoyl fluoride by its infrared spectrum, physical properties and conversion to benzanilide by reaction with aniline. The intermediate distillation cut, which was a mixture of chlorobenzene and benzoyl fluoride, when treated with aniline, formed 6.1 g. of benzanilide. Thus, the total conversion to benzoyl fluoride was 21% of that theoretically possible.

EXAMPLES 2–7

Example 1 was repeated with the same reactants in the same amounts, but varying the temperature and pressure conditions as shown in the following table. The table also shows the conversions to benzoyl fluoride.

TABLE I

| Example | Reaction temp., °C. | CO pressure, atm. | Percent conversion to $C_6H_5COF$ |
| --- | --- | --- | --- |
| 2 | 250 | 900 | 0.5 |
| 3 | 300 | 900 | 28.0 |
| 4 | 310 | 900 | 30.5 |
| 5 | 325 | 900 | 55.0 |
| 6 | 350 | 900 | 77.5 |
| 7 | 300 | 600 | 11.8 |

EXAMPLES 8–11

Example 1 was repeated, using 2.0–2.5 g. of a 10% palladium on carbon catalyst in place of palladium chloride. Table II below shows the results at various operating conditions.

TABLE II

| Example | Reaction temp., °C. | Catalyst, g. | CO pressure atm. | Percent conversion to $C_6H_5COF$ |
| --- | --- | --- | --- | --- |
| 8 | 350 | 2.0 | 600 | 72.8 |
| 9 | 350 | 2.0 | 300 | 54.0 |
| 10 | 350 | 2.0 | 100 | 23.4 |
| 11 | 325 | 2.5 | 900 | 60.2 |

EXAMPLES 12–18

Example 1 was repeated using various combinations of palladium catalysts and Lewis acids, as shown in Table III below. It will be noted that, in Examples 12–14, no added Lewis acid was present.

TABLE III

| Example | Pd catalyst | Lewis acid | Temp., °C. | Pressure, atm. | Percent conversion to $C_6H_5COF$ |
| --- | --- | --- | --- | --- | --- |
| 12 | $PdCl_2$, 0.5 g | None | 300 | 900 | 12.9 |
| 13 | 10% Pd on C, 1.0 g | do | 350 | 900 | 49.2 |
| 14 | 0.3% Pd on $SiO_2$-$Al_2O_3$, 2.5 g | do | 350 | 600 | 8.6 |
| 15 | $PdCl_2$, 0.5 g | $SnCl_4$, 1.0 g | 300 | 900 | 21.9 |
| 16 | $PdCl_2$, 0.1 g | $ZnBr_2$, 1.0 g | 300 | 900 | 14.4 |
| 17 | 10% Pd on C, 1.0 g | $BF_3$, 1.0 g | 350 | 900 | 63.8 |
| 18 | 10% Pd on C, 1.0 g | HCl, 0.35 g | 350 | 600 | 52.7 |

EXAMPLE 19

Example 1 was repeated, using the same reactants in the same amounts, except that the palladium chloride was replaced by 0.5 g. of a mixture of anhydrous ruthenium chlorides (di-, tri- and tetrachloride). The operation was conducted at 325° C. and at a carbon monoxide pressure of 900 atmospheres. The conversion to benzoyl fluoride was 44.3%.

EXAMPLE 20

The pressure vessel of Example 1 was charged with 50 g. of p-dichlorobenzene, 35 g. of sodium fluoride, 0.5 g. of palladium chloride and 1.0 g. of aluminum chloride. After sealing, a pressure of 200 atmospheres of carbon monoxide was applied, the vessel heated to 325° C. and the pressure raised to 900 atmospheres with carbon monoxide. The vessel was maintained at this temperature and pressure for 4 hours, during which time a cumulative pressure drop of 705 atmospheres was noted. The tube was allowed to cool, vented and 90 g. of solid product discharged. Of this product, 48.9 g. was volatile below 142° C./0.1 mm. By gas chromatography, this was determined to consist of a mixture of 44% (21.5 g.) of recovered p-dichlorobenzene, 40.1% (19.6 g., 36% conversion) of p-chlorobenzoyl fluoride and 15.9% (7.77 g., 13.5% conversion) of terephthaloyl fluoride.

EXAMPLE 21

The pressure vessel of Example 1 was charged with 28.7 g. of 4,4′-dichlorodiphenyl sulfone, 19.5 g. of sodium fluoride, 0.5 g. of palladium chloride, 1.0 g. of aluminum chloride and 90 g. of benzene. After sealing, a pressure of 200 atmospheres of carbon monoxide was applied and the vessel was heated to 300° C. The carbon monoxide pressure was then raised to 900 atmospheres and the vessel was maintained at that pressure and temperature with shaking for 4 hours. The reaction mixture, after removal of the insoluble inorganic salts by filtration and benzene by distillation, was flash-distilled at 250° C. and 0.1 mm. pressure. The distillate was a light colored solid, 16.68 g., whose infrared spectrum showed that it contained an acid fluoride. Extraction of the solid with alcoholic potassium hydroxide followed by acidification converted 5.4 g. of the distillate to a mixture of 4,4-dicarboxydiphenyl sulfone and 4-carboxy-4'-chlorodiphenyl sulfone. The remaining 11.28 g. of distillate was identified as recovered 4,4'-dichlorodiphenyl sulfone. Thus, about 19% of the dichlorosulfone starting material had been converted to a mixture of mono- and dicarboxylic acid fluorides. These reaction products can be isolated as such from the reaction mixture by chromatographic treatment.

EXAMPLE 22

A charge of 16.2 g. of 1-chloronaphthalene, 5 g. of sodium fluoride, 1.0 g. of a 10% palladium-on-carbon catalyst, 0.5 g. of aluminum chloride and 75 ml. of benzene was treated as in Example 21 except that the temperature was 350° C., and the reaction mixture was worked up in the same manner to give 13.6 g. of volatile reaction product. Treatment of this material with aniline converted the acid fluoride to the anilide in a vigorous exothermic reaction. Isolation of the anilide showed that 19.7% of the 1-chloronaphthalene starting material had been converted to 1-naphthoyl fluoride. The reaction product can, of course, be isolated as such from the reaction mixture by fractional vacuum distillation or chromatographic treatment.

EXAMPLE 23

Example 22 was repeated except that the 1-chloronaphthalene was replaced by 15.4 g. of 4-chloroacetophenone. The product of the flash distillation consisted of 5.37 g. of semisolid material. It contained p-acetylbenzoyl fluoride, as shown by the fact that alkaline hydrolysis produced 1.0 g. of p-acetylbenzoic acid (i.e., p-carboxyacetophenone).

EXAMPLE 24

A pressure vessel charged with 25 g. of p-bromotoluene, 5 g. of sodium fluoride, 0.5 g. of 10% palladium-on-carbon and 0.5 g. of aluminum chloride was heated with agitation for 4 hours at 300° C. under a carbon monoxide pressure of 900 atmospheres. The contents of the vessel were then discharged and the vessel was rinsed with 75 ml. of benzene. Distillation of the product gave 15.68 g. of volatile material after removal of the benzene. Reaction of the crude product with anhydrous ammonia in ether solution produced 7.1 parts of p-toluamide, showing that 36% of the p-bromotoluene had been converted to p-toluoyl fluoride. This product can be isolated as such from the reaction mixture by fractional distillation.

EXAMPLE 25

A charge of 75 g. of chlorobenzene, 28 g. of sodium fluoride, 1.0 g. of a 5% rhodium-on-carbon catalyst and 0.5 g. of aluminum chloride was placed in a corrosion-resistant pressure vessel. The vessel was heated with agitation for 4 hours at 350° C. under a 900 atmosphere carbor monoxide pressure. The distillable reaction product was subjected to gas chromatography. The conversion to benzoyl fluoride was 71.9%.

EXAMPLE 26

A pressure vessel was charged with 25 g. of 4-bromophenyl phenyl ether, 10 g. of sodium fluoride and 1 g. of 10% palladium-on-carbon catalyst. No Lewis acid was used. The vessel was sealed, pressured to 200 atmospheres with carbon monoxide and heated to 300° C., at which point the pressure was increased to 900 atmospheres with carbon monoxide. The vessel was agitated at 300° C. for 4 hours, cooled, vented and the reaction product was distilled. The distillate (14.25 g.) was assayed by gas chromatography and found to consist of 95.1% of p-phenoxybenzoyl fluoride and 4.9% of a second, unidentified component. The p-phenoxybenzoyl fluoride was identified by its infrared spectrum; by saponification to p-phenoxybenzoic acid, M.P. 160.5–161° C.; and by conversion to p-phenoxybenzanilide, M.P. 152–155° C. The conversion to p-phenoxybenzoyl fluoride was 62.2%.

EXAMPLE 27

By essentially the method of Example 26, 50 g. of 4-chlorophenyl phenyl ether, 15 g. of sodium fluoride, 1 g. of a 10% palladium-on-carbon catalyst, and carbon monoxide were processed at 350° C. and a maximum pressure of 700 atmospheres for 4 hours. The product mixture was flash-distilled at 140° C./0.1 mm. The distillate (44.18 g.) was assayed by gas chromatography and found to contain 67.5% p-phenoxybenzoyl fluoride and 32.5% unreacted 4-chlorophenyl phenyl ether. The conversion to p-phenoxybenzoyl fluoride was 65.4%, B.P. 66° C./0.05 mm.

EXAMPLE 28

By essentially the procedure of Example 1, a mixture of 49.4 g. of pentafluorobromobenzene, 10 g. of sodium fluoride, 1.0 g. of 10% palladium-on-carbon, and carbon monoxide was processed at 325° C. and 600 atm. for four hours. The product contained 30.8% pentafluorobenzoyl fluoride and 66.2% recovered pentafluorobromobenzene.

EXAMPLE 29

A charge of 6 grams of 4,4'-dichlorobiphenyl (melting point 144 to 147° C.), 75 grams of benzene, 2.5 grams sodium fluoride, 0.5 gram 10% palladium-on-charcoal catalyst and 0.5 gram aluminum chloride was heated at 350° C. in an atmosphere of carbon monoxide at a pressure of 600 atmospheres for 4 hours. The reaction mixture after removal from the pressure vessel was distilled. The product consisted of 2.5 grams of matter boiling higher than benzene. This was hydrolyzed by reaction with aqueous sodium hydroxide to a mixture of 4-(4-chlorophenyl)benzoic acid and biphenyl-4,4'-dicarboxylic acid. Examination of the crude distillate before hydrolysis showed it to be a mixture of acid fluorides.

EXAMPLE 30

By essentially the method of Example 1, a mixture of 75 g. of chlorobenzene, 1 g. of 10% palladium-on-carbon, 20 g. of anhydrous hydrogen fluoride, and carbon monoxide was processed at 350° C. and 600 atm. for 4 hours. Characterization of the product mixture indicated that 40.7% of the chlorobenzene had been converted to benzoyl fluoride.

The process of this invention is applicable to any aromatic halide as defined above. Other representative examples of aromatic acid fluorides that can be prepared by the described procedure are given in the following Table IV, in which the left-hand column lists the aromatic halide starting materials by name and the right-hand column shows the resulting aromatic acyl fluoride by formula.

TABLE IV

| Aromatic halide | Aromatic acyl fluoride |
| --- | --- |
| o-Diiodobenzene | 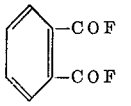 |

TABLE IV—Continued

| Aromatic halide | Aromatic acyl fluoride |
| --- | --- |
| 2-bromonaphthalene | naphthalene-COF |
| 1,8-dichloronaphthalene | naphthalene-1,8-(COF)$_2$ |
| 1-chloroanthracene | anthracene-1-COF |
| 2,2'-dichlorobiphenyl | biphenyl-2,2'-(COF)$_2$ |
| 4-chloro-p-terphenyl | terphenyl-COF |
| 4,4'-dibromodiphenylmethane | FOC—C$_6$H$_4$—CH$_2$—C$_6$H$_4$—COF |
| 1-phenyl-2-(2'-chlorophenyl)-ethane | C$_6$H$_5$—CH$_2$—CH$_2$—C$_6$H$_4$—COF |
| 4-(n-hexyl)-bromobenzene | C$_6$H$_{13}$—C$_6$H$_4$—COF |
| 1-chloro-4,5-diethylnaphthalene | 4,5-(C$_2$H$_5$)$_2$-naphthalene-1-COF |
| 3,5-dimethoxychlorobenzene | 3,5-(OCH$_3$)$_2$-C$_6$H$_3$—COF |
| p-Butoxyiodobenzene | C$_4$H$_9$O—C$_6$H$_4$—COF |
| 1-chloro-4,5-diethoxynaphthalene | 4,5-(OC$_2$H$_5$)$_2$-naphthalene-1-COF |
| Ethyl p-chlorobenzoate | C$_2$H$_5$OOC—C$_6$H$_4$—COF |
| Propyl 4-chloronaphthoate | 4-(COOC$_3$H$_7$)-naphthalene-1-COF |
| n-Hexyl-(4-chlorophenyl)-ketone | C$_6$H$_{13}$—CO—C$_6$H$_4$—COF |
| 4-bromobenzophenone | C$_6$H$_5$—CO—C$_6$H$_4$—COF |
| 4-chloro-4'-carboxydiphenyl sulfide | HOOC—C$_6$H$_4$—S—C$_6$H$_4$—COF |
| o-Chlorobenzonitrile | o-(CN)-C$_6$H$_4$—COF |
| 2,6-dichloronaphthalene | naphthalene-2,6-(COF)$_2$ |

The process of the present invention can be used to make aromatic acid fluoride compounds heretofore unknown, which are valuable as intermediates for the production of useful compounds. Thus, p-phenoxybenzoyl fluoride, the preparation of which is described in Example 27 of the foregoing can be reacted with glycerin in the presence of a base to form the glyceryl ester of p-phenoxybenzoic acid, useful as a plasticizer for synthetic polymers such as polyvinyl chloride.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A process for preparing aromatic acyl fluorides which comprises contacting and reacting, under substantially anhydrous conditions, at a temperature of at least 250° C. and under a pressure of at least 100 atmospheres, an aromatic halide free of Zerewitinoff active hydrogen having the formula $$Ar(X)_n$$

wherein Ar is a monocyclic, polycyclic or fused polycyclic aromatic radical containing from one to three six-membered carbocyclic aromatic rings or a polycyclic radical containing two six-membered carbocyclic aromatic rings joined through an atomic bridge which is —O—, —S—, —SO$_2$—, —CO— or —(CH$_2$)$_m$ where $m$ is 1 or 2 and in which X is a halogen of atomic number 17–53 attached to nuclear carbon of an aromatic carbocyclic ring, and $n$ is 1 or 2, with carbon monoxide and at least an approximately stoichiometric amount of an alkali metal fluoride or hydrogen fluoride in the presence of a catalytic amount of a catalyst of metallic ruthenium, rhodium or palladium or chloride or bromide salts thereof.

2. Process of claim 1 in which said aromatic halide is chlorobenzene.

3. Process of claim 1 in which said aromatic halide is p-dichlorobenzene.

4. Process of claim 1 in which said aromatic halide is 4-chlorophenyl phenyl ether.

5. Process of claim 1 in which said aromatic halide is 4,4'-dichlorobiphenyl.

6. Process of claim 1 in which said aromatic halide is chloropentafluorobenzene.

7. Process of claim 1 in which the reaction is additionally conducted in the presence of a catalytic amount of an inorganic Lewis acid.

8. Process of claim 7 in which said inorganic Lewis acid is a halide of an element selected from hydrogen, boron, aluminum, tin and zinc.

9. Process of claim 8 in which said catalyst is present in an amount of from 0.0005 to 0.01 g. atom/mole of said aromatic halide in the case of ruthenium metal, rhodium metal and palladium metal, and from 0.0005 to 0.01 mole/mole of said aromatic halide in the case of the halides of ruthenium, rhodium and palladium.

10. Process of claim 9 wherein said Lewis acid is present in an amount 0.001 to 0.02 mole/mole of said aromatic halide.

11. Process of claim 10 wherein said Lewis acid is aluminum chloride.

References Cited

UNITED STATES PATENTS

| | | | |
|---|---|---|---|
| 3,452,090 | 6/1969 | Mador | 260—544 |
| 3,423,456 | 1/1969 | Mador | 260—544 |
| 2,696,503 | 12/1954 | Prichard | 260—544 |

OTHER REFERENCES

Taft et al. J. Chemical Physics, Vol. 38 No. 2 (1963) QD1J83.

LORRAINE A. WEINBERGER, Primary Examiner

E. J. GLEIMAN, Assistant Examiner

U.S. Cl. X.R.

260—465 D, 469, 473 G, 476 R, 516, 544 F